Dec. 19, 1961     D. R. CARLISLE     3,013,731
FUEL INJECTORS FOR GAS TURBINE ENGINES
Filed July 27, 1959     2 Sheets-Sheet 1
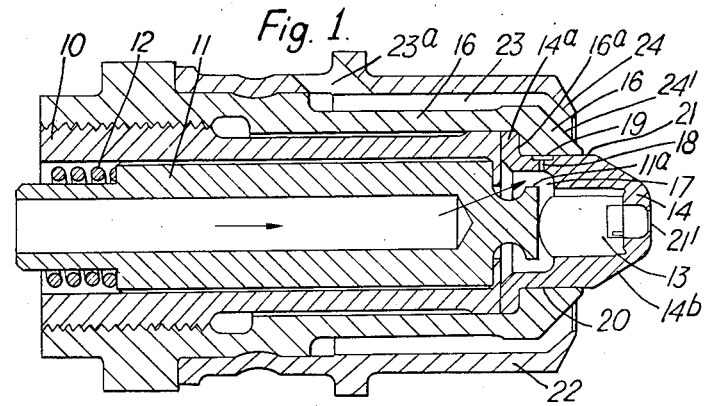
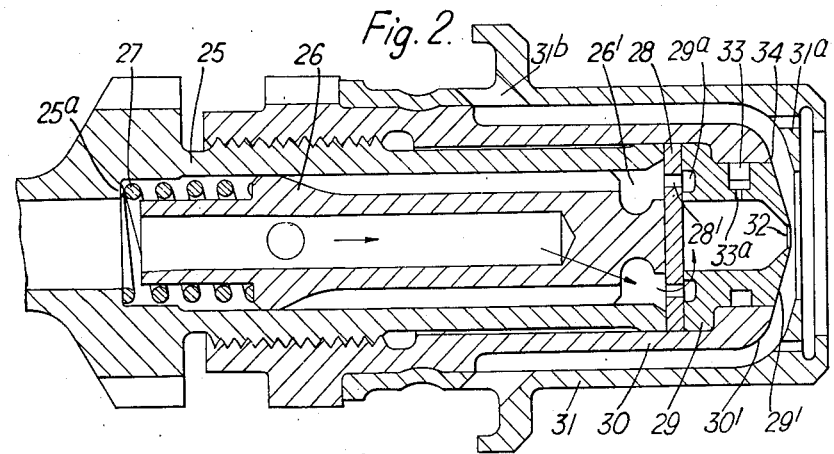
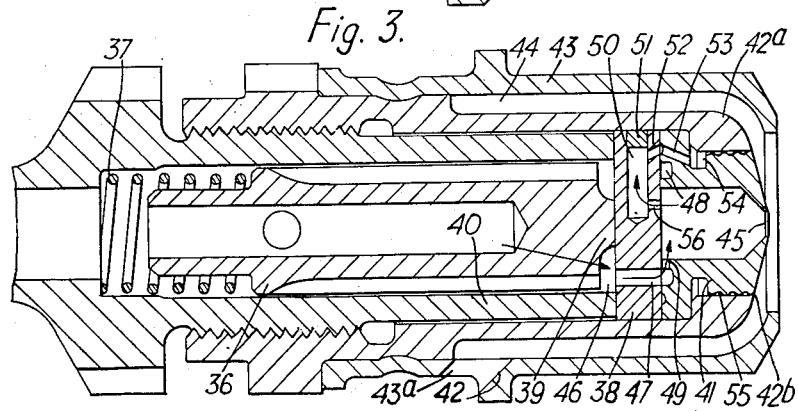
Inventor:
Denis Richard Carlisle
By Fred E. Shoemaker,
Fred L. Witherspoon, Jr.
            Attorneys Dec. 19, 1961   D. R. CARLISLE   3,013,731
FUEL INJECTORS FOR GAS TURBINE ENGINES
Filed July 27, 1959   2 Sheets-Sheet 2

Denis Richard Carlisle
Inventor

By Fred E. Shoemaker,
Fred L. Witherspoon, Jr.
Attorneys

United States Patent Office 3,013,731
Patented Dec. 19, 1961

3,013,731
FUEL INJECTORS FOR GAS TURBINE ENGINES
Denis Richard Carlisle, Risley, England, assignor to Rolls-Royce Limited, Derby, England, a company of Great Britain
Filed July 27, 1959, Ser. No. 829,691
Claims priority, application Great Britain Aug. 6, 1958
4 Claims. (Cl. 239—132)

This invention is for improvements in fuel injectors for gas turbine engines and has for its object the prevention of the build up of carbon deposit around the external wall of the swirl chamber of the injector which normally forms the end wall thereof immediately behind the nozzle from which the fuel is injected and which is exposed to be contacted by the burning gases.

The invention is useful for gas turbine engines in which the injector in operation is comparatively cool (say up to 150° C.) and the fuel used will not crack at such temperatures.

According to the present invention there is provided a fuel injector for a gas turbine engine, said fuel injector having a wall exposed to be contacted by burning gases and provided with a fuel atomising orifice, and means for directing a supply of fuel over said wall so as to hinder the formation of carbon deposits thereon from said gases.

Preferably an air supply means is provided which directs a flow of air over the wall provided with the atomising orifice. The air supply means may comprise an annular channel surrounding the atomising orifice.

Preferably the injector comprises means for tapping a portion of the fuel flowing through the injector towards the atomising orifice, and means for directing said tapped portion over said wall. Thus the atomising orifice may be provided in the wall of a chamber forming part of the injector, the tapping means comprising one or more apertures extending through said chamber so that a portion of the fuel within the chamber may pass through said aperture or apertures and flow over the said wall.

Figure 4:
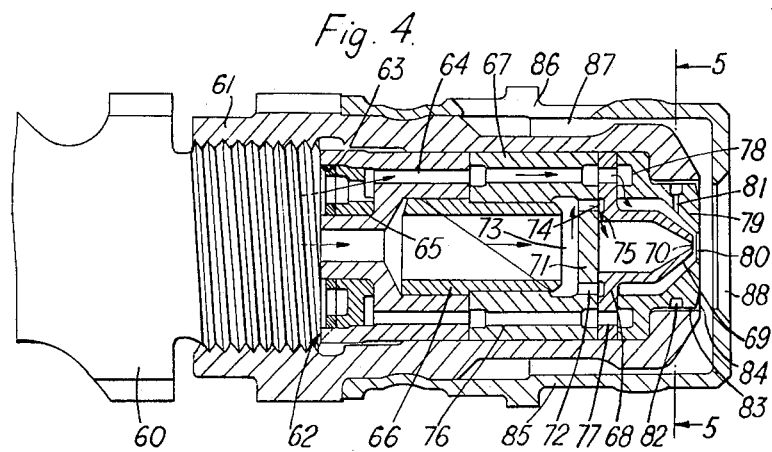
Figure 5:
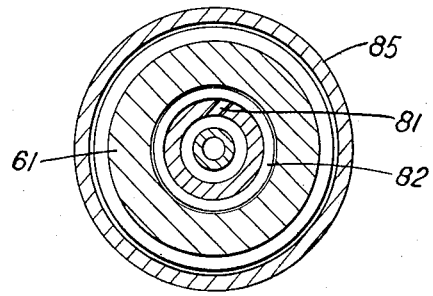

The invention is illustrated, merely by way of example, in the accompanying drawings in which:

FIGURES 1–4 are respectively axial sections through various fuel injectors according to the present invention, and FIGURE 5 is a section taken on the line 5—5 of FIGURE 4.

The terms "left" and "right" as used in the following description are to be understood to indicate the left and right as viewed in the respective drawings.

In FIGURE 1 there is shown a fuel injector for a gas turbine engine, the body 10 of the injector containing a cylindrical filter element 11 whose left hand end is adapted to be supplied with fuel. The filter element 11 is held by a spring 12 at its right hand end which urges an extension 11a at its other end against a swirl plug 13 in a swirl chamber 14. The swirl chamber 14 is retained by having a radial flange 14a trapped between the right hand end of the body 10 and a shoulder 16a internally of the right hand end of a cap nut 16. The extension 11a of the filter is situated in a chamber 17 which is supplied with fuel from the filter 11 and from which fuel passes into the swirl chamber 14 where it is at a lower pressure than in the chamber 17. The pressure in chamber 17 is full fuel pressure.

A series of radial tappings 18 is provided in the wall of chamber 17 which lead to an annular channel 19 on the exterior surface of the swirl chamber 14. A passage 20 is formed by a small radial gap such as ¼ thousandth of an inch between the exterior surface of the swirl chamber 14 and the internal surface of the nut 16, the end of this gap constituting an annular orifice 21 through which the fuel from the channel 19 passes to flow over a frusto-conical portion 14b of the swirl chamber at the apex of which is provided a fuel atomising orifice 21'. The frusto-conical portion is seen to be exposed to contact with the burning gases in the combustion chamber.

A generally cylindrical shroud member 22 surrounds the nut 16 and an annular passageway 23 is formed between the shroud member 22 and the exterior of the cap nut 16. The passageway 23 is supplied with combustion air from passages 23a which extend obliquely through the shroud member 22. At its downstream end the shroud member 22 has a frusto-conical portion 24. The latter, together with a frusto-conical portion 24' at the right hand end of the cap nut 16, causes the passageway 23 to be inwardly directed to bring about a flow of combustion air over the frusto-conical portion 14b of the swirl chamber 14.

A thin film of fuel flows from the annular orifice 21 over the frusto-conical portion 14b of the swirl chamber 14 and helps to wash off any carbon which tends to be deposited. Surrounding this film of fuel there is also an annulus of air from the annular passageway 23 which also tends to prevent carbon deposition.

In the modified fuel injector shown in FIGURE 2, the body of the injector is shown at 25 and contains a filter member 26. A spring 27 supported by a shoulder 25a formed on the body 25 holds the filter member 26 against a distance piece 28 which abuts the left hand end of a swirl chamber 29. The swirl chamber 29 is retained by a cap nut 30 which is secured on to the body 25. A shroud member 31 surrounds the exterior of the end of the cap nut 30 and swirl chamber 29. The shroud member 31 has obliquely arranged passages 31b therethrough and has an inwardly-directed end portion 31a. The latter directs a flow of combustion air received from passages 31b over frusto-conical end surfaces 29', 30' of the swirl chamber 29 and cap nut 30 respectively towards an atomising orifice 32 at the apex of the frusto-conical surface 29'.

An annular channel 33 is formed in the outer wall of the swirl chamber and connects with the interior of the swirl chamber through radial holes 33a. A small clearance which terminates in an annular orifice 34 is provided between the downstream end of the cap nut 30 and the exterior surface of the swirl chamber 29.

Fuel passes from a chamber 26' at the end of the filter member 26 and through axial drillings 28' in the distance piece 28 to an annular channel 29a in the wall of the swirl chamber 29. Fuel in the channel 29a passes through radial ports (not shown) into the interior of the swirl chamber. Fuel from the swirl chamber 29 will pass through the radial holes 33a to the annular channel 33 and so to the annular orifice 34.

A film of fuel from the orifice 34 surrounded by an annulus of combustion air from the shroud 31 will flow over the downstream frusto-conical wall 29' of the swirl chamber 29 and will help in preventing carbon deposition thereon from its exposure to burning gases. As the fuel at the outer radius of the swirl chamber is at a lower pressure than in the chamber 17 in the FIGURE 1 construction, the gap can be made greater. This is advantageous as manufacturing problems are eased and there is less tendency for the gap to become blocked with dirt which may be present in the fuel.

The fuel injector shown in FIGURE 3 is generally similar in construction to that shown in FIGURE 2. A filter element 36 is held between a spring 37 and distance piece 38 against which an extension 39 of the filter element abuts. The distance piece 38 is sandwiched between the body 40 of the injector and the swirl chamber 41 which is retained by cap nut 42.

The cap nut 42 is surrounded by a shroud 43 with which it forms a passageway 44. Air may enter the passageway 44 through holes 43a in the shroud 43, such air being directed over the outside of the swirl chamber in the direction of an injection orifice 45. Fuel passes from a chamber 46 at the right hand end of the filter element 36 through axial drillings 47 in distance piece 38 to an annular channel 48 in the wall of the swirl chamber and through radial ports 49 to the interior thereof.

A radial hole 50 closed by a plug 51 is provided in distance piece 38 and communicates through a hole 52 with a hole 53 in the body of the swirl chamber. The hole 53 leads to an annular channel 54 in the outer surface of the swirl chamber. A clearance 55 is provided between the outer surface of the swirl chamber 41 and the internal surface of the end portion 42a of the cap nut 42. The clearance 55 terminates in an annular orifice 42b.

Fuel is supplied to the radial drilling 50 in the distance piece from the interior of the swirl chamber 41 through a drilling 56 which is positioned inwardly from the outer boundary of the fuel therein and therefore at a point where the fuel pressure is lower than in either the FIGURE 1 or FIGURE 2 arrangements. A larger clearance may therefore be provided between the swirl chamber 41 and portion 42a of cap nut 42 and also the ports 52 and 53 can be made larger, easing manufacture and reducing the likelihood of dirt being trapped therein. A further advantage is that any dirt in the fuel in the swirl chamber tends to get carried radially away from drilling 56 by centrifugal force.

Each of the fuel injectors shown in FIGURES 1–3 is provided with only one swirl chamber and atomising orifice. In the fuel injector shown in FIGURES 4 and 5, however, there are provided a pilot and a main swirl chamber each of which has an atomising orifice.

The fuel injector shown in FIGURES 4 and 5 comprises a body 60 about which is mounted a cap nut 61. Within the cap nut 61 there is mounted a cylindrical filter housing 62 having at its left hand end an annular recess 63 which communicates with the right hand end of the housing 62 by way of holes 64.

A main, annular, filter 65 is mounted in the recess 63 while a cylindrical pilot filter 66 is mounted internally of the housing 62.

A cup-shaped distance piece 67 is interposed between the filter housing 62 and a radial flange 68 of a swirl chamber 69. The chamber 69, which is provided with an atomising orifice 70, constitutes a pilot nozzle.

The cup-shaped distance piece 67 has a radially extending wall 71 provided with axially directed apertures 72 therethrough. The latter communicate at their left hand ends with a chamber 73 formed within the distance piece 67. At their right hand ends the apertures 72 communicate with an annular groove 74 in the flange 68. The groove 74 communicates with the interior of the swirl chamber 69 by way of one or more radial ports 75. Fuel may thus be supplied to the chamber 69 and orifice 70 by way of the filter 66, chamber 73, apertures 72, groove 74 and ports 75.

The distance piece 67 is provided with axially extending channels 76 therethrough. At their left hand ends the channels 76 communicate with the holes 64 and at their right hand ends they communicate, via axially directed holes 77 in the flange 68, with an annular groove 78 in a swirl chamber 79.

The swirl chamber 79, which is provided with an atomising orifice 80 and which extends about the swirl chamber 69, constitutes a main nozzle. Fuel is supplied to the interior of the swirl chamber 79 via filter 65, holes 64, channels 76, holes 77, annular groove 78 and radial ports (not shown) extending inwardly from the groove 78.

The chamber 79 has an obliquely directed hole 81 through its wall, the hole 81 leading to an annular space 82 formed between the chamber 79 and cap nut 61. Fuel which has passed from the interior of the swirl chamber 79 to the space 82 passes through an annular clearance 83 between the chamber 79 and cap nut 61 so as to be directed over a frusto-conical surface 84 at the right hand end of the swirl chamber. The flow of fuel over the surface 84 tends to wash off any carbon which may become deposited thereon from its exposure to the burning gases.

A shroud member 85, having obliquely directed holes 86 therethrough, is mounted about the cap nut 61. The shroud member 85 forms with the cap nut 61 an annular passageway 87 which communicates with an aperture 88 at the right hand end of the shroud member. Combustion air for the combustion of the fuel atomised at the orifices 70, 80 is supplied thereto via the holes 86 and passageway 87.

It will be appreciated that in the construction shown in FIGURES 4 and 5 the flow of fuel over the surface 84 will occur only when the said main nozzle is in operation and that there will be no fuel flow over the surface 84 when the pilot nozzle only is in operation. The use of the pilot nozzle by itself, however, normally occurs only for very short periods of time and, during such periods, low temperature and pressure conditions prevail as a result of which little carbon is produced.

When the pilot nozzle only is in operation, gases will be sucked back through the annular clearance 83, annular space 82, and hole 81 due to the pumping action of the pilot spray. It is therefore important that these gases should not contain carbon particles since such particles may cause blocking of the parts 81—3. As will be seen from FIGURE 4, however, the hole 88 is concentric to and has the same radius as the internal circumference of the annular clearance 83. This ensures that the gases sucked back through the parts 81—3 are derived from the passageway 87 and are therefore free from carbon.

I claim:

1. A fuel injector for a gas turbine engine comprising in combination, means forming a main swirl chamber having a generally circular wall and an external front wall of substantial area which is positioned to be directly exposed to the burning gases and which is provided with a central main fuel atomizing orifice, means for directing a flow of fuel to be atomized from said chamber through the atomizing orifice, means for simultaneously directing from said chamber a supply of non-atomized fuel from around the periphery of said external wall and upstream of said orifice to mingle with the fuel emerging from the said atomizing orifice and means providing a thin annular air channel surrounding the atomizing orifice beyond said wall periphery, said channel being constructed to continuously direct a supply of air parallel to and over the whole supply of non-atomized fuel covering the outer surface of said external front wall to deliver said non-atomized fuel toward said orifice as a complete film on the surface of said front wall to wash therefrom carbon particles resulting from the burning gases.

2. A fuel injector for a gas turbine engine comprising in combination, delivery means for combustion air, means forming a main swirl chamber having a generally circular wall and front wall of substantial area which is positioned to be directly exposed to the burning gases and which is provided with a central main fuel atomizing orifice, means for directing a flow of fuel to be atomized through the injector, swirl chamber and said atomizing orifice, means forming a delivery annulus of small capacity surrounding said area, means extending through said circular wall for continuously tapping a portion of the fuel flowing through said swirl chamber towards the atomizing orifice and directing it to said delivery annulus and means delivering at least a portion of said combustion air so as to direct said tapped fuel portion over the external wall as a film of non-atomized fuel flowing toward said atomizing orifice.

3. A fuel injector for a gas turbine engine, said fuel injector comprising a housing, annular wall means forming a main swirl chamber so mounted within said housing as to provide a small annular gap between the housing and the outer periphery of said wall means, said swirl chamber having a rear wall and an external substantially conical wall of substantial area which is arranged to be exposed to the burning gases and which is provided with fuel atomizing orifice at the apex of the cone, a swirl chamber wall having at least one aperture therethrough in an upstream wall thereof, said gap extending toward the downstream end of the chamber to said aperture and surrounding said annular wall means, said aperture communicating with said gap whereby fuel is delivered to the external wall periphery upstream of said atomizing orifice, and means to direct said last mentioned fuel over said conical wall and towards said atomizing orifice as a continuous film so as to hinder the formation of carbon deposits on said external wall.

4. A fuel injector for a gas turbine engine comprising means forming a central pilot swirl chamber having a conical forward wall provided with a central fuel atomizing orifice, wall means providing a main swirl chamber co-axial with and surrounding the pilot swirl chamber and conical wall and having a shallow conical external wall which is arranged to be exposed to the burning gases provided with a central main atomizing orifice co-axial to and downstream of the pilot orifice, means to deliver fuel alternatively to said swirl chambers, means co-operating with said main swirl chamber wall forming an annular orifice, means for directing a supply of non-atomized fuel from said main swirl chamber through said annular orifice simultaneously with that supplied through the main atomizing orifice, and means for directing a flow of air radially inwardly over said annular orifice to direct the fuel therefrom as a continuous film over the whole of said conical external wall and toward said main atomizing orifice to merge with the fuel issuing therefrom to thereby hinder the formation of carbon deposits on said conical external wall.

References Cited in the file of this patent

UNITED STATES PATENTS

| | | |
|---|---|---|
| 2,524,820 | Miles | Oct. 10, 1950 |
| 2,701,164 | Purchas et al. | Feb. 1, 1955 |
| 2,703,260 | Olson et al. | Mar. 1, 1955 |
| 2,878,065 | Watkins | Mar. 17, 1959 |